United States Patent [19]

Nakase et al.

[11] Patent Number: 4,989,409

[45] Date of Patent: Feb. 5, 1991

[54] EXHAUST DEVICE FOR SMALL SIZED BOAT ENGINE

[75] Inventors: Ryoichi Nakase; Shigeharu Mineo, both of Hamamatsu, Japan

[73] Assignee: Sanshin Kogyo Kabushiki Kaisha, Hamamatsu, Japan

[21] Appl. No.: 411,033

[22] Filed: Sep. 22, 1989

[30] Foreign Application Priority Data

Sep. 22, 1988 [JP] Japan .................................. 63-238260

[51] Int. Cl.⁵ ................................................ F01N 3/02
[52] U.S. Cl. .......................................... 60/321; 440/89
[58] Field of Search ........................... 60/320, 321, 323; 440/89

[56] References Cited

U.S. PATENT DOCUMENTS 3,485,040 12/1969 Niskanen ................................ 60/321
4,194,460 3/1980 Sato ........................................ 440/89
4,707,986 11/1987 Takada ................................... 60/323
4,773,883 9/1988 Nakasa ................................... 60/322

Primary Examiner—Douglas Hart
Attorney, Agent, or Firm—Ernest A. Beutler

[57] ABSTRACT

A small watercraft embodying an improved exhaust system that is substantially completely watercooled by a cooling jacket. The exhaust system includes an elastic joint that is also completely surrounded by the cooling jacket so as to insure adequate cooling under all running conditions. A damming arrangement is incorporated so as to insure that all of the exhaust portions being cooled will be completely encircled with cooling water even when low amounts of water are being circulated and a drain system is also provided so as to insure that the cooling jackets will be drained when the watercraft is removed from a body of water.

8 Claims, 6 Drawing Sheets

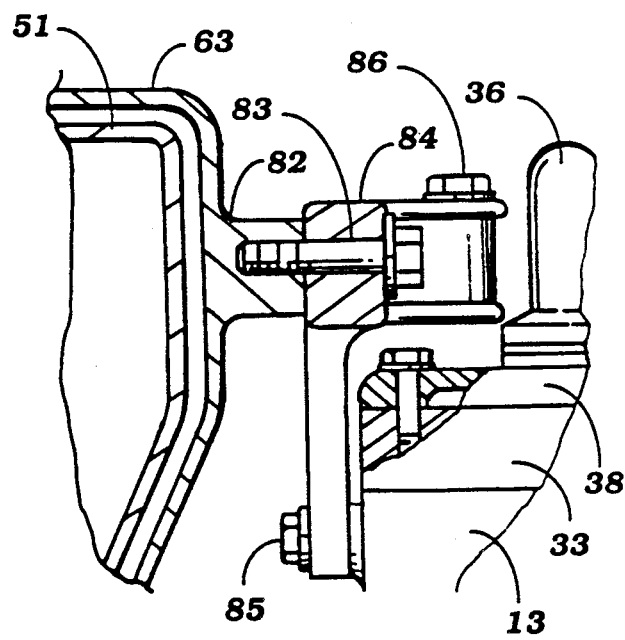

EXHAUST DEVICE FOR SMALL SIZED BOAT ENGINE

BACKGROUND OF THE INVENTION

This invention relates to an exhaust device for a small sized boat engine and more particularly to an improved arrangement for discharging and cooling the exhaust gases from an internal combustion engine, particularly when applied in a marine application.

In conjunction with the application of internal combustion engines for powering marine craft, it is a common practice to discharge at least a portion of the cooling water from the engine cooling jacket into the exhaust system so as to cool the exhaust and silence it. When this is done, it is possible to employ elastic joints in the exhaust system so as to permit some relative movement, absorb vibrations and avoid against undue stresses in the exhaust system. However, it has been found that the amount of cooling water discharged into the exhaust manifold may not be sufficient under all running conditions to cool the elastic joints adequately. If not cooled adequately, the joint can deteriorate with age with eventual failure.

It has, therefore, been proposed to provide a further arrangement for cooling the elastic joints. However, the type of cooling systems previously proposed have not truly been effective in providing adequate cooling for all parts of the elastic joint.

It is, therefore, a principle object of this invention to provide an improved arrangement for cooling an elastic joint in an internal combustion engine exhaust system.

It is a further object of this invention to provide an improved exhaust system for a small watercraft wherein the elastic joints in the system are adequately cooled under all conditions.

SUMMARY OF THE INVENTION

This invention is adapted to be embodied in an exhaust system for an internal combustion engine that is comprised of a first inner pipe having an outlet end and a second inner pipe having an inlet end spaced from the outlet end of the first inner pipe. A first outer pipe encircles at least in part the first inner pipe and a second pipe encircles at least in part the second inner pipe. The outer pipes have spaced apart ends. An inner elastic joint interconnects the outlet and inlet ends of the inner pipes for exhaust gas flow therebetween. An outer elastic joint connects the ends of the outer pipes to define a cooling jacket around the first elastic joint. Means are provided for admitting cooling water to the cooling jacket for cooling the elastic joint.

BRIEF DESCRIPTION OF THE DRAWINGS

FIG. 9 is a cross sectional view taken along the line 9—9 of FIG. 8.

DETAILED DESCRIPTION OF THE PREFERRED EMBODIMENT OF THE INVENTION

Figure 1:
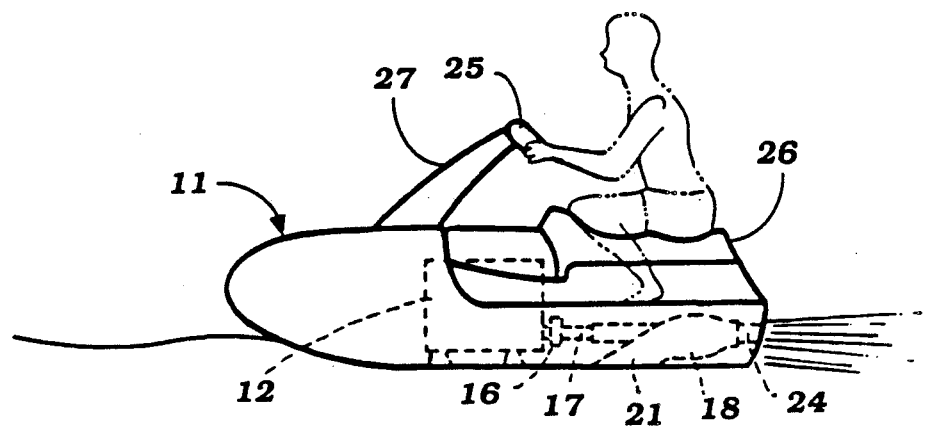
FIG. 1 is a side elevational view of a small watercraft constructed in accordance with an embodiment of the invention.
Figure 2:
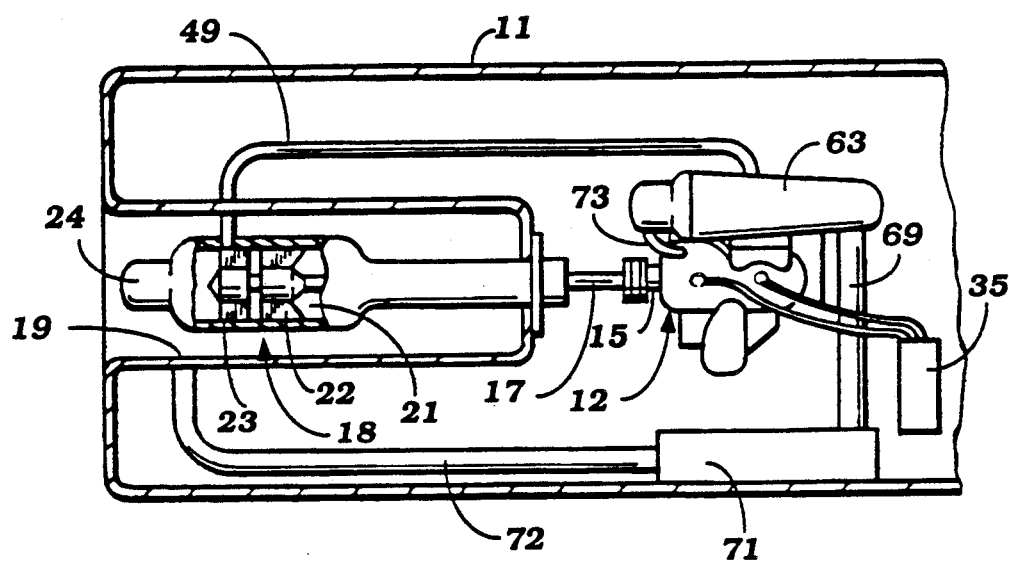
FIG. 2 is a top plan view, with portions broken away and other portions in section, of the drive arrangement for the small watercraft.
Figure 3:
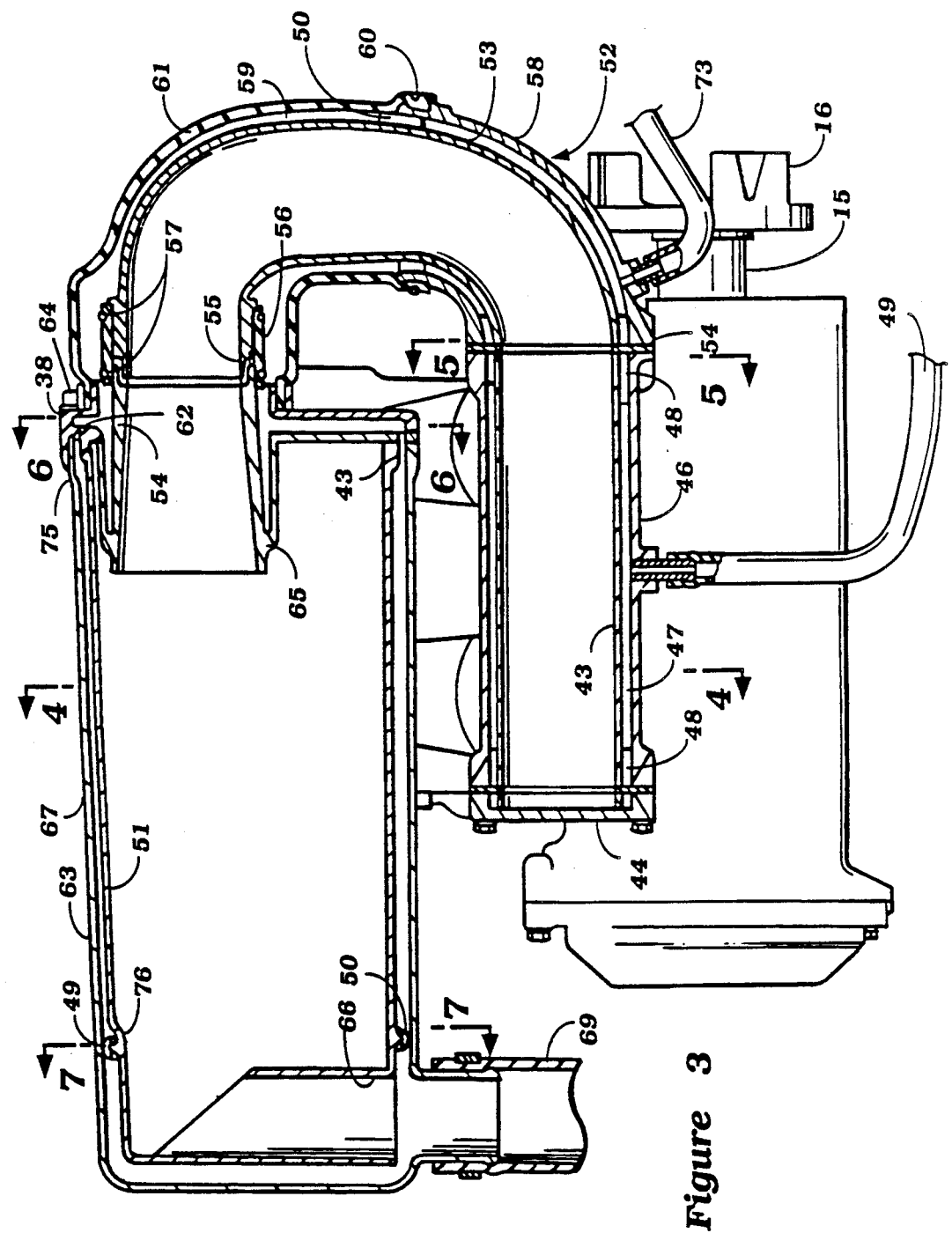
FIG. 3 is an enlarged cross sectional view taken through the exhaust system of the engine generally along the line 3—3 of FIG. 4.

Referring first to FIGS. 1 and 2, a small watercraft is indicated generally by the reference numeral 11 and is depicted as a typical environment in which the invention may be employed. The small watercraft 11 is provided with an engine compartment in which an internal combustion engine 12 is positioned. Although the invention is capable of use with a wide variety of types of engines, in the illustrated embodiment, the engine 12 of the two cylinder in-line type and operates on the two-stroke crankcase compression principle.

Figure 4:
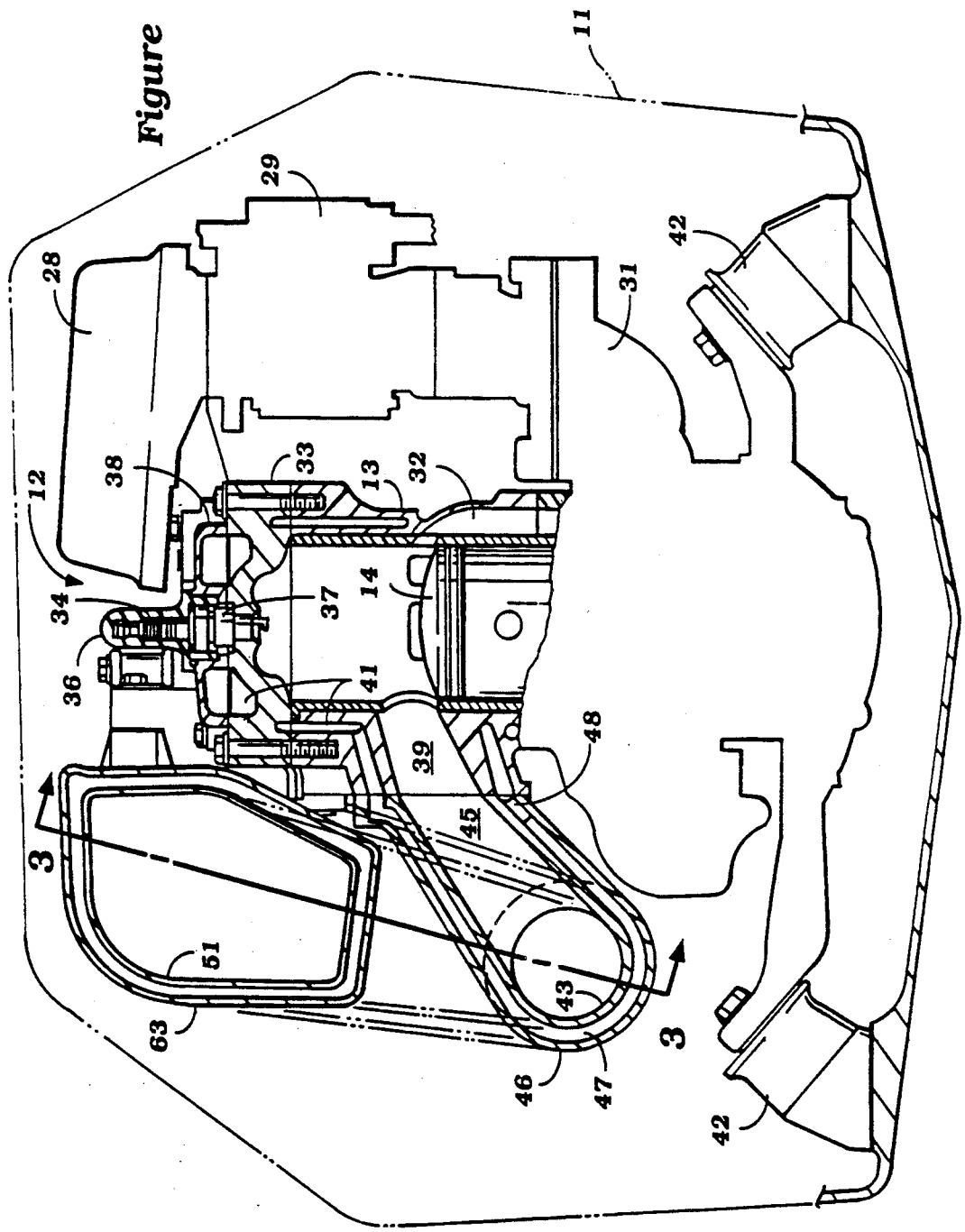
FIG. 4 is a cross sectional view taken generally along the line 4—4 of FIG. 3 and shows the engine and its exhaust system.

As may be seen in FIG. 4, the engine 12 is comprised of a cylinder block 13 in which a pair of cylinder bores (only one of which appears in this figure) are formed. Pistons 14 reciprocate in these cylinder bores and are connected by means of connecting rods (not shown) to a crankshaft 15 of the engine. The crankshaft 15 is coupled by means of a coupling 16 to a driveshaft 17 of a jet propulsion unit indicated generally by the reference numeral 18.

The jet propulsion unit 18 is positioned within a recess or tunnel 19 formed centrally and at the rear of the hull of the watercraft 11. The jet propulsion unit 18 includes a downwardly facing water inlet 21 into which water is drawn past by an impeller 22 and is discharged past straightening vanes 23. The water is then discharged through a steering nozzle 24 that is steered by a means of a handlebar assembly 25 positioned immediately forward of a rider's seat 26 on a mast 27. A rider, shown in phantom in FIG. 1, is adapted to sit upon the seat 26 in a straddle fashion for operating the watercraft in a well known manner.

Referring again to FIG. 4, the engine 12 is provided with an induction system that includes an air intake device 28 which delivers air to one or more carburetors 29. The carburetors 29 in turn deliver a fuel air charge to the crankcase chambers of the engine through an intake manifold 31. This charge is then transferred to the combustion chamber through respective scavenge passages 32, as is well known in this art.

A cylinder head 33 is affixed to the cylinder block 13 in a known manner and mounts individual spark plugs 34 for each of the cylinders of the engine. The spark plugs 34 are fired by means of a suitable ignition system depicted schematically in FIG. 2 at 35.

It should be noted that the spark plugs 34 are provided with combined terminals and protective boots 36 which encircle the exposed portion of the spark plug 34 and which have a skirt portion 37 that extends into a recess in the cylinder head cover 38 so as to provide a good water tight seal.

The exhaust gases from the individual combustion chambers are discharged through respective exhaust ports 39 that extend through the side of the cylinder block 13 and which cooperate with an exhaust manifold and exhaust system of a type to be described.

The engine 12 is also provided with a liquid cooling system that includes a cooling jacket 41 that encircles the components of the engine to be cooled and which is formed in the cylinder block 13 and cylinder head 33. Coolant is drawn for the engine cooling system from the body of water in which the watercraft is operating in a suitable manner and discharged in a manner which will be described.

The engine 12 is mounted within the hull of the watercraft by means of a plurality of resilient engine mounts 42 (FIG. 4).

The exhaust system for the engine will now be described by primary reference to the remaining figures, (3 through 8) although the exhaust system is also shown partially schematically in FIG. 2. There is provided an exhaust manifold that is comprised of a generally cylindrical expansion chamber portion 43 that runs longitudinally along one side of the engine and which is closed at one end by means of a cover plate 44. The expansion chamber 43 communicates with the individual exhaust ports 39 of the cylinder block 33 through respective runner portions 45.

In accordance with the invention, the cylindrical portion 43 is further enclosed by means of a cylindrical outer member 46 which defines a jacket or cooling chamber 47 around the periphery of the manifold portion 43 and also around the individual runners 45. Coolant is delivered to the cooling jacket 47 from the jet propulsion unit 18 through a flexible conduit 49. The coolant delivered to the cooling jacket 47 is then transferred through restricted ports 48 to the cooling jacket 41 of the engine 12. The size of the ports 48 will determine how much water is delivered from the cooling jacket 47 to the engine cooling jacket 41.

The first expansion chamber formed by the manifold portion 43 communicates with a second expansion chamber, indicated by the reference numeral 51 through a U-shaped connecting joint 52 constructed in accordance with an embodiment of the invention. This U-shaped connecting joint 52 includes a first inner U-shaped tube 53 that communicates at its inlet end with the expansion chamber 43 of the manifold with an interposed gasket 54 so as to provide sealing and also so as to permit some flexibility in the connection. The first inner tube 53 is connected to a megaphone tube 54 that extends into the expansion chamber 51 by means of a slip joint 55. There is a slight air gap between the ends of the inner pipe 53 and the megaphone tube 54 which forms a second inner pipe. An elastic inter connecting joint 56 encircles this slip joint and is held in place by means of a pair of hose clamps 57. As a result, some flexibility will be allowed between the inner pipe 53 and the megaphone tube 54 so as to permit expansion and contraction and also so as to absorb vibrations.

A first outer pipe 58 encircles at least a portion of the length of the first inner pipe 53 and defines between these pipes a cooling jacket, indicated generally by the reference numeral 59. There are a plurality of ribs 50 that extend integrally between the inner pipe 53 and the outer pipe 58 so as to provide a unitary construction and permit water flow between the portions of the cooling jacket 59. A further elastic outer joint 61 encircles the remainder of the inner pipe 53, overlies the elastic joint 56 and is affixed to a flange portion 62 which is fixed to an outer housing or jacket 63 of the second expansion chamber 51 with the megaphone tube 54 by bolts, by a hose clamp 64. As a result, the cooling jacket 59 encircles the elastic joint 56. The other end of the outer joint 61 is held in place by a clamp 60.

It should be noted that the megaphone tube 54 is also formed with an outer portion 65 so as to form an extension of this cooling jacket into the expansion chamber 51.

The second expansion chamber 51 has a vertically extending pipe portion 66 formed at its outer end which communicates with a cooling jacket 67 that encircles the expansion chamber 51 and which is formed by the outer housing 63. An exhaust outlet pipe nipple 68 is formed in this outer jacket 63 and has slipped over it a flexible conduit 69 which delivers the exhaust gases to a still further expansion chamber and watertrap device 71. This device 71 then discharges the exhaust gases through a conduit 72 to the tunnel 22 around the jet propulsion unit 18 for discharge into the body water in which the watercraft is operating.

It should be noted that coolant from the engine may also be discharged into the exhaust manifold 43 in a suitable manner so as to provide additional cooling and silencing.

Water is delivered to the cooling jacket 59 of the joint 52 by means of a conduit 73 that communicates with a portion of the engine cooling jacket 41. This coolant will circulate around the joint 56 so as to cool it and then can enter into the megaphone section. In order to insure that the joint 56 is fully encircled by coolant even during times when the engine is running slow and a low amount of water is circulated, there is a wall formed by the megaphone section 54 which has a dam like effect and which wall is indicated generally by the reference numeral 74. This wall has a pair of upwardly positioned apertures 75 at their upper peripheral edges so as to insure that the joint 56 will be encircled with cooling water at all times then the engine is running. This water can then flow through the apertures 75 to the jacket 67 so as to cool the second expansion chamber 51.

There is a still further dam formed around the discharged end of the expansion chamber 51 by means of a gasket member 76 which gasket member has a pair of openings 77 at its upper end so as to provide the same damming effect and trap water around the expansion chamber 51 even when the engine is running at slow speeds. As a result, it should be observed that all critical components of the exhaust system will be completely surrounded by water under all running conditions and this will insure good cooling particularly of the elastic joints.

It is, of course, desirable that the water will be drained from these cooling jackets when the engine is not running and the watercraft is taken out of the body of water in which it is operating. To this end, the gasket 76 is provided with a bleed opening 78 at its lower end which will let the water bleed out of this jacket and be discharged into the exhaust system through the nipple 68. In a like manner, the wall 74 is provided with a bleed port 79 which will permit the water to bleed out in this same direction.

Figure 5:
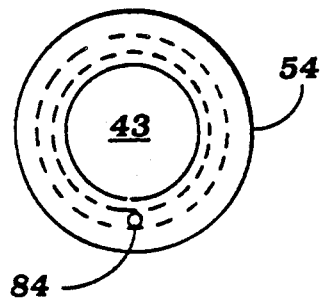
FIG. 5 is a cross sectional view taken along the line 5—5 of FIG. 3.
Figure 6:
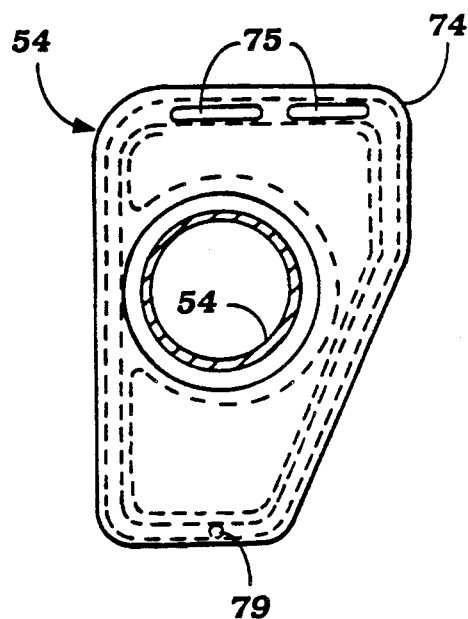
FIG. 6 is a cross sectional view taken along the line 6—6 of FIG. 3.
Figure 7:
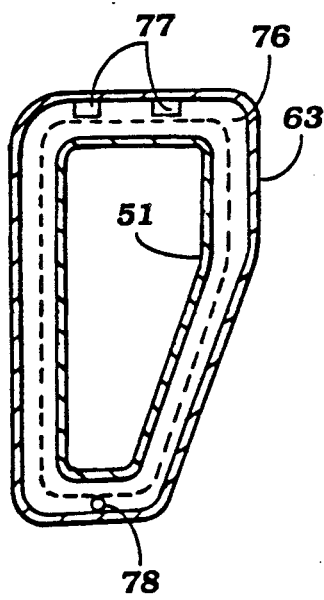
FIG. 7 is a cross sectional view taken along the line 7—7 of FIG. 3.

The gasket 54 (FIG. 5) between the joint 52 and the first expansion chamber 43 is also provided with a bleed port 81. In this way, when the engine is not running and the watercraft is out of the body of water in which it is operating, the cooling jacket 59 may drain through this bleed port 81 and the conduit 49 for discharge.

Figure 8:
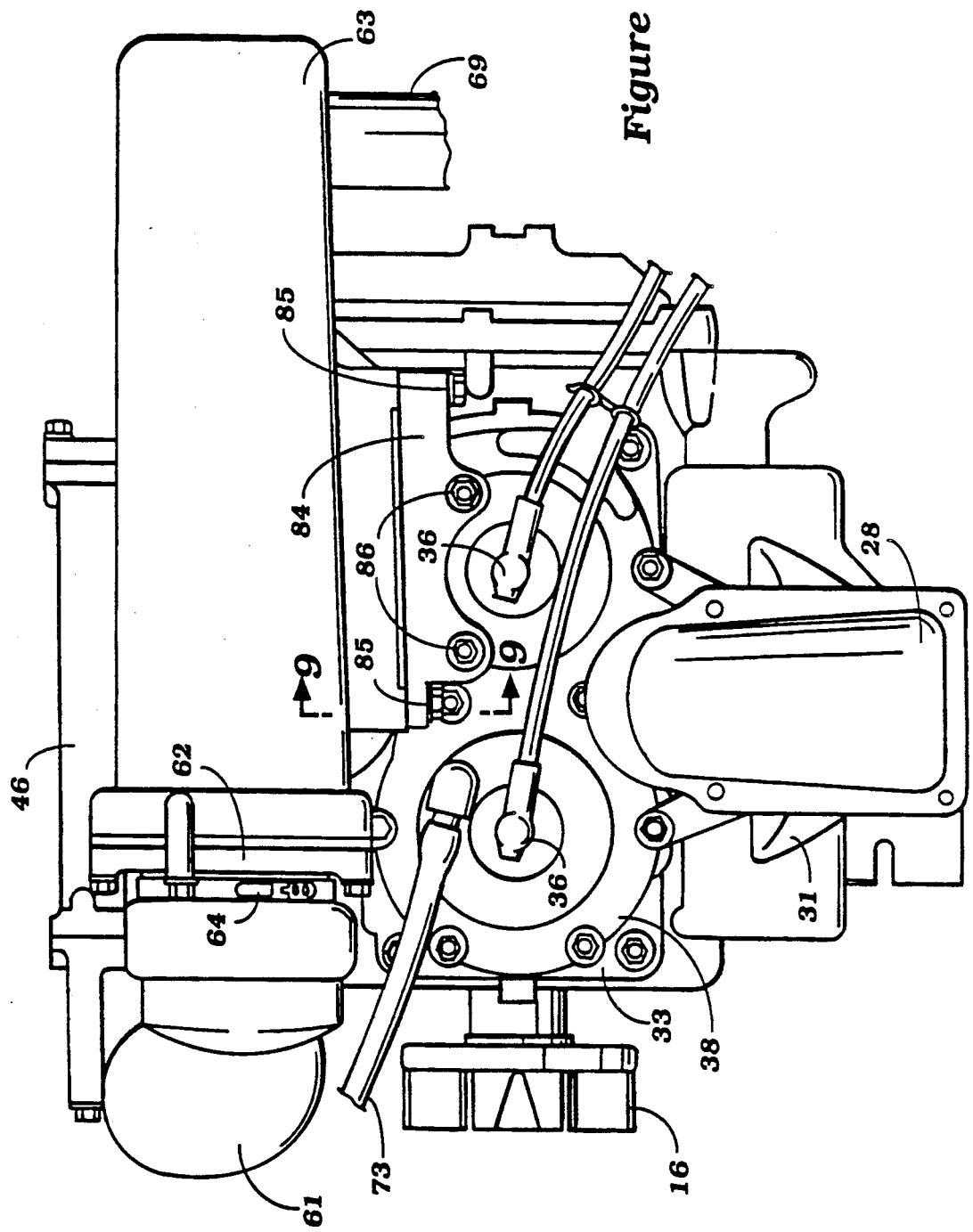
FIG. 8 is a top plan view of the engine.

The exhaust system and particularly the expansion chamber 51 is mounted from the engine by a construction best shown in FIGS. 8 and 9. There is provided mounting bosses 82 on the outer jacket 63 that receive threaded fasteners 83 that pass through a mounting bracket 84. The mounting bracket 84 is affixed to the cylinder block 13 by means of threaded fasteners 85. In addition, threaded fasteners 86 also secure the mounting bracket 84 to the cylinder head coverplate 38 for further rigidity.

It should be readily apparent from the foregoing description that the described system provides a very effective exhaust system for a small watercraft and one in which the elastic joints are always well cooled and will, therefore, be protected from deterioration. Although an embodiment of the invention has been illustrated and described, various changes and modifications may be made without departing from the spirit and scope of the invention as defined by the appended claims.

What is claimed:

1. An exhaust system for an internal combustion engine comprising a first inner pipe having an outlet end, a second inner pipe have an inlet end and spaced from the outlet end of said first inner pipe, a first outer pipe encircling at least in part said first inner pipe, a second outer pipe encircling at least in part said second inner pipe, said outer pipes having spaced apart ends, an inner elastic joint interconnecting the outlet and inlet ends of said inner pipes for exhaust gas flow therebetween, an outer elastic joint connecting the ends of said outer pipes to define a cooling jacket around said inner elastic joint, and means for admitting cooling water to said cooling jacket.

2. An exhaust system for an internal combustion engine as set forth in claim 1 further including an exhaust manifold communicating with the first inner pipe at an outlet end thereof and receiving exhaust gases from the engine.

3. An exhaust system for an internal combustion engine as set forth in claim 2 further including a cooling jacket encircling said manifold.

4. An exhaust system for an internal combustion engine as set forth in claim 3 wherein the cooling water is delivered to the manifold cooling jacket from a cooling jacket of the engine.

5. An exhaust system for an internal combustion engine as set forth in claim 3 further including an expansion chamber formed at least in part by the second inner pipe.

6. An exhaust system for an internal combustion engine as set forth in claim 1 wherein the outer elastic joint is longer than the inner elastic joint.

7. An exhaust system for an internal combustion engine as set forth in claim 3 wherein the outer elastic joint is longer than the inner elastic joint.

8. An exhaust system for an internal combustion engine as set forth in claim 5 wherein the outer elastic joint is longer than the inner elastic joint.

* * * * *